Nov. 4, 1941.    R. H. MARTIN    2,261,121
MACHINE GUN MOUNTING FOR AIRCRAFT
Filed July 5, 1938    3 Sheets-Sheet 1

INVENTOR.
Rudiger H. Martin
BY
ATTORNEYS

Nov. 4, 1941.          R. H. MARTIN          2,261,121
                MACHINE GUN MOUNTING FOR AIRCRAFT
          Filed July 5, 1938         3 Sheets-Sheet 2

Rudiger H. Martin INVENTOR.

BY

ATTORNEYS

Nov. 4, 1941.   R. H. MARTIN   2,261,121
MACHINE GUN MOUNTING FOR AIRCRAFT
Filed July 5, 1938   3 Sheets-Sheet 3

Rudiger H. Martin   INVENTOR.
BY
ATTORNEYS

Patented Nov. 4, 1941

2,261,121

UNITED STATES PATENT OFFICE 2,261,121

MACHINE GUN MOUNTING FOR AIRCRAFT

Rudiger H. Martin, Ocean Park, Calif., assignor to Dubois-Martin Aircraft Corporation, Du Bois, Pa., a corporation of Pennsylvania Application July 5, 1938, Serial No. 217,412

3 Claims. (Cl. 89—37.5)

This invention relates to an improved machine gun mounting for airplanes and has, for one of its principal objects, the provision of a turret-like structure which incloses one or more machine-guns and a gunner, and which is built into either the lower portion of an airplane or other aircraft fuselage or wing or the upper portion thereof, and which, furthermore, can be mechanically lowered below the underside of the fuselage or wings or raised above thereof for firing purposes.

One of the important objects of this invention is the provision of a machine-gun turret or the like which can be built into the underside or upper side of an aircraft or other fuselage or wings and which, in addition to projecting from the fuselage, can also be rotated throughout a 360° arc, thereby making the same available for firing in any direction and also at any angle with respect to the airplane itself.

Another important object of the invention is the provision of means in such a turret-like structure for an airplane whereby the same can be readily and simply rotated and controlled by the occupant with considerable speed, ease and accuracy, and without interfering in any way with the operation or firing of the contained guns.

Another and still further object of the invention resides in the provision of a machine-gunner's basket or turret for airplanes which is retractible into the fuselage of the airplane when not in use, thereby rendering the same absolutely non-interfering so far as the practical and efficient operation of the airplane itself is concerned.

Other and further important objects of the invention will be apparent from the disclosures in the accompanying drawings and following specification.

The invention, in a preferred form, is shown in the drawings and hereinafter more fully described.

Figure 1:
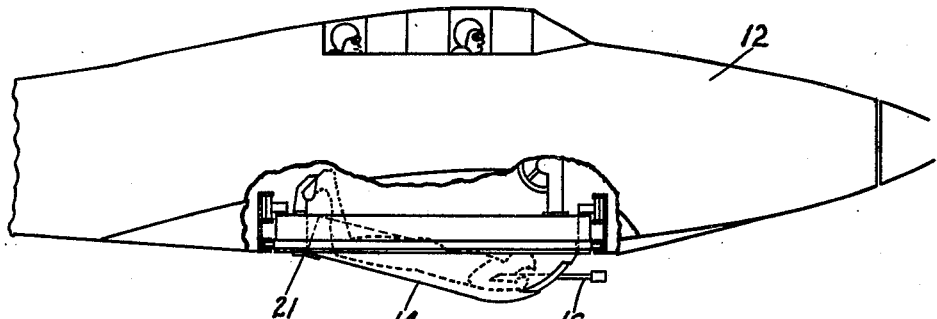
Figure 1 is a side elevation, parts being broken away and parts being shown in dotted lines, of the improved directional machine-gun mounting for airplanes of this invention, showing the gunner's turret or basket in operative position and with the gun in firing position.
Figure 2:
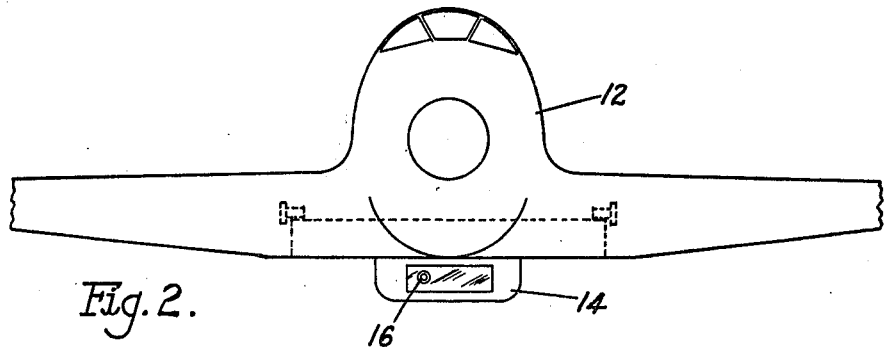
Figure 2 is a front elevation of the structure of Figure 1.

The reference numeral 12 indicates generally the fuselage of an airplane or other aircraft, and in the bottom of the fuselage is mounted the gun turret 14 of this invention equipped with a gun 16.

Figure 3:
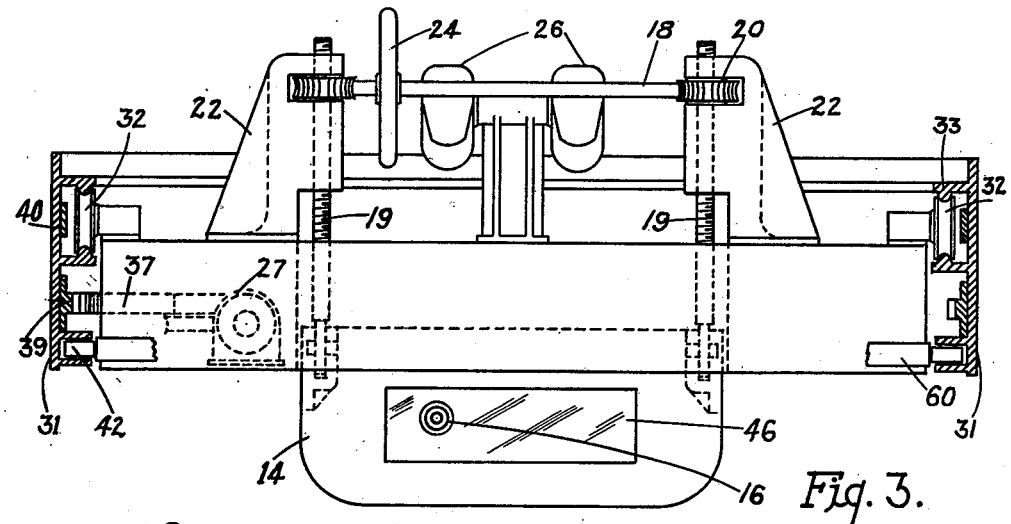
Figure 3 is an enlarged detail view of some of the structure illustrated in Figure 2, showing the gunner's basket and its various appurtenances.
Figure 4:
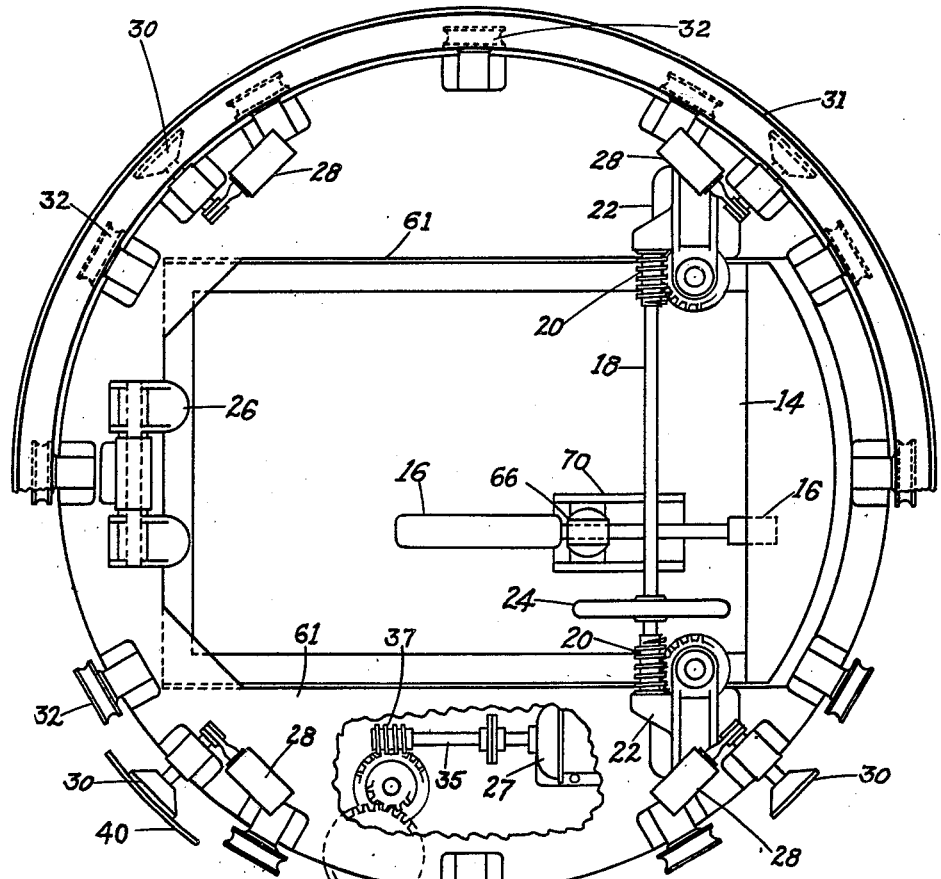
Figure 4 is a top plan view of the turret or basket assembly indicating the various supports and controls.

The details of the turret itself are best shown in Figures 3 and 4, the same including an elevator mechanism comprising a shaft 18 having worm gears 20 thereon and at either end thereof, the same being mounted in bearings or castings 22 through which the screw spindle moves, and mounted on the worm shaft 18 is a hand-wheel 24 by means of which the shaft is turned. As best shown in Figure 3, rotation of the hand-wheel 24 and the worms 20 will, in turn, rotate correspondingly screw-threaded shafts 19, moving the same up or down through the castings or bearings 22, the lower ends of these shafts being pivotally connected to the forward end of the basket or turret 14, the rear end being pivoted or hinged as shown at 21 in Figure 1.

The means by which the turret is rotated comprises essentially a pair of foot pedals 26 which are electrically connected to a driving motor 27, there being also associated with the rotatable structure a series of solenoids 28 which operate brake shoes 30, the brake shoes, in turn, engaging a circumscribing band 40 which is part of the support 31 for the entire structure.

Bearing wheels 32 support the rotary base on the shell or ring 31 and ride in the tracks 33 provided therefor in the shell.

A motor 27 drives the shaft 35 and gears 37 which engage a toothed rack 39 also mounted in the supporting shell or ring 31.

Figure 7:
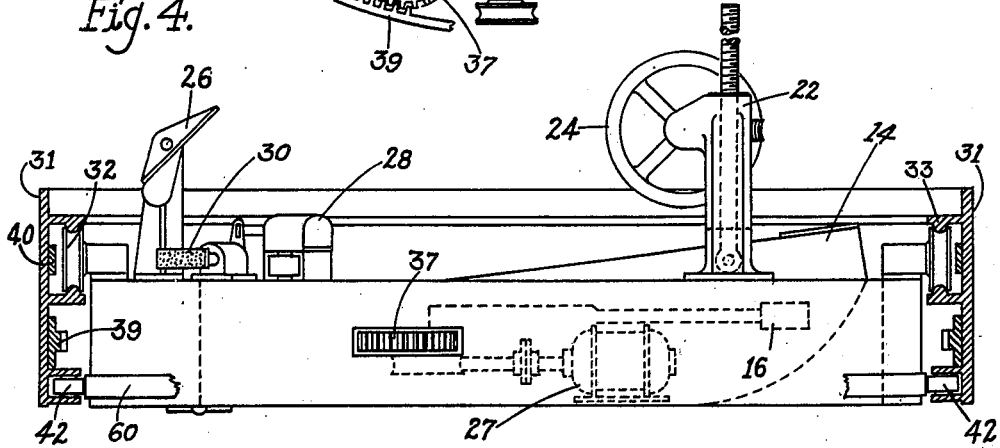
Figure 7 is a side elevation of the structure of Figure 4.

A continuous brake band 40 is fitted into the ring 31 for operation of the brake shoes 30 thereagainst, and at the lower edge of the ring 31 is provided a series of vertical thrust bearing wheels 42 operating in suitable guides as best shown in Figure 7.

Figures 5, 6:
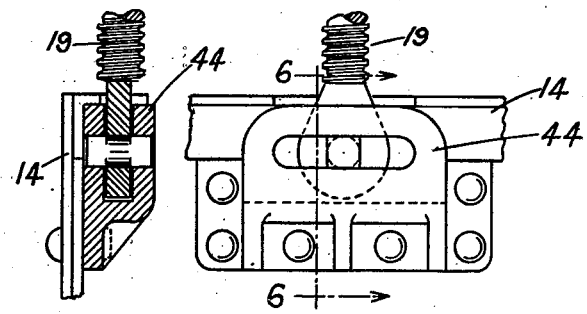
Figure 5 is a detail view of a part of the structure illustrated in Figure 3; namely, the element which raises and lowers the gun basket.
Figure 6 is a sectional view taken on the line 6—6 of Figure 5, looking in the direction indicated by the arrows.

At 19 in Figures 5 and 6 is shown the lower end of the screw spindle which raises and lowers the gun basket 14 and its pivoted connection to mountings 44 in the side of the basket, this being necessary in view of the differential in position inasmuch as the forward end of the gunner's basket is lowered along an arc. The forward end of the basket is provided with a bullet-proof window 46 through which the gun 16 projects as best shown in Figure 3.

Figures 8, 9:
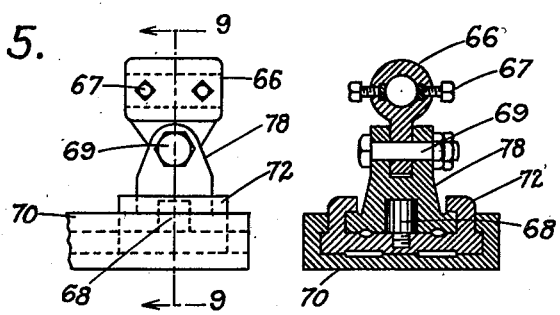
Figure 8 is a side view of the mounting used for a single gun.
Figure 9 is a sectional view taken on the line 9—9 of Figure 8, looking in the direction indicated.

Figures 8 and 9 are detail views of a single gun mounting, the element 66 being a vertically pivoting clamp through which the gun barrel passes and in which it is held by means of set screws 67, the device being pivoted on a pin 69 and at the lower end is provided a pin 68 upon which the mounting turns in a horizontal plane. 70 is a stationary track for the gun and 72 represents the sliding pivotal base.

Figure 10:
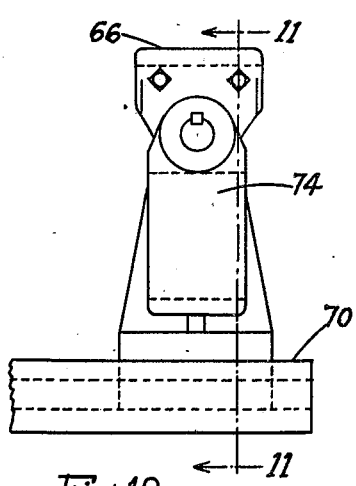
Figure 10 is an elevation of a modified form of the invention, showing a mounting for a plurality of guns.
Figure 11:
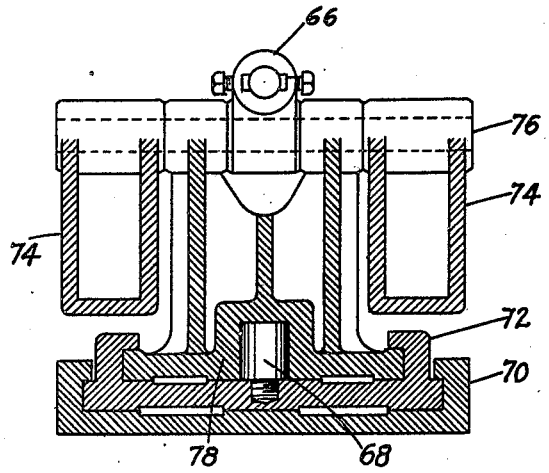
Figure 11 is a sectional view taken on the line 11—11 of Figure 10.

Figures 10 and 11 show modified forms of gun mountings wherein two or more guns may be supported, the reference numerals 74 in each case representing slings or castings for support of side guns, these being swingingly mounted upon a shaft 76. Likewise on such a shaft is mounted a clamp 66 for a single gun such as shown in Figures 8 and 9, and the remainder of the structure including the pin 68 upon which the mounting turns, the stationary track 70 in which the device is positioned, and the sliding pivotal base 72 are the same as in connection with the single mounting gun shown and described in Figures 8 and 9. The pivotal mounting is shown at 78.

In operation, the gunner first positions himself in the basket or turret 14 as shown in Figure 1, and reaching down toward the front of the basket, lowers the forward part of the structure by means of a hand-wheel 24 and then slides the gun or guns 16 forward and positions himself behind the same in a prone position also as illustrated in Figure 1, extending his legs upward from his knees, he engages his feet in the right and left stirrup pedals 26 which operate the motor 27 in the rotary base and support. By exerting pressure on either pedal, he will engage the motor to rotate him to the right or left as desired, this rotation being accomplished by means of the motor shaft 35, the gears 37 and the rack 39, all as best shown in Figure 4.

The operation of starting the motor automatically shuts off the current to the solenoid brakes 28, thus releasing them from the brake band 40 in the ring 31 and allowing the turret to rotate. Obviously, this rotation can take place through an arc of 360°. Six of the bearing wheels 32 ride on the lower half of the track in the ring 31 and six ride on the upper half of the track 33, this method of supporting automatically compensating for changes in direction of thrust due to maneuvering of the plane. The twelve side-thrust bearings 42 on the stationary shell riding against a track 60 on the side of the rotary base (Figure 7) take care of changes in off-vertical thrusts. A solid bearing surface between the sides of the gunner's basket 14 and the rotary base as the basket is raised or lowered is accomplished by bearing strips 61.

The opening in the front end of the gunner's basket is sufficient so that the guns may be swung for approximately five degrees to either side or can be deflected a similar distance upward and downward, this allowing for manual aiming without rotating the basket.

The described structure may also be mounted in the upper surface of the fuselage in which case the process and means of elevation and depression of the turret or basket and the other operation thereof is practically identical with that described herein with exception that the gunner may be positioned seated, with suitable forwardly projected extensions of foot-pedals 26. When so mounted the turret is elevated for firing position instead of depressed and is lowered into retracted position. Also the described structure may be mounted in the wings instead of the fuselage, with identical effect.

It will be obvious that herein is provided a turret-shaped structural device consisting of a rotary base, a gunner's basket therein, all mounted in a supporting shell which constitutes an aircraft armament including a directional machine-gun monitor, enabling the airplane or other aircraft equipped therewith to operate very effectively on the offensive and from a position which has heretofore been considered very ineffective so far as offensive work is concerned.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A directional machine-gun mounting for airplanes, comprising a stationary supporting shell positioned inside the airplane and forming an integral part of the airplane, a circular track on the supporting shell, a rotary base mounted inside the track, a series of bearing wheels between the base and track, and a gunner's basket hingedly mounted in the rotary base, and means for mechanically tilting the basket into a position outside and below the body of the airplane, a friction brake strip in the supporting shell, and a series of electrically operated brake shoes normally acting against the brake strip for stopping the basket in any desired position.

2. A directional machine-gun mounting for airplanes, comprising a stationary supporting shell positioned inside the airplane and forming an integral part of the airplane, a circular track on the supporting shell, a rotary base mounted inside the track, a series of bearing wheels between the base and track, and a gunner's basket hingedly mounted in the rotary base, and means for mechanically tilting the basket into a position outside the airplane, a friction brake strip in the supporting shell, and a series of electrically operated brake shoes normally acting against the brake strip, together with an electric motor in the base, a spur gear operated by the motor, a gear tooth rack mounted on the inside face of the supporting shell and in mesh with the spur gear of the motor.

3. A directional machine-gun mounting for airplanes, comprising a stationary supporting shell positioned inside the airplane and forming an integral part of the airplane, a circular track on the supporting shell, a rotary base mounted inside the track, a series of bearing wheels between the base and track, and a gunner's basket hingedly mounted in the rotary base, and means for mechanically tilting the basket into a position outside the airplane, a friction brake strip in the supporting shell, and a series of electrically operated brake shoes normally acting against the brake strip, together with an electric motor in the base, a spur gear operated by the motor, a gear tooth rack mounted on the inside face of the supporting shell, and in mesh with the spur gear of the motor, and vertical and horizontal thrust bearings between the rotary base and the supporting shell.

RUDIGER H. MARTIN.